United States Patent [19]

Klausing

[11] Patent Number: 5,451,957

[45] Date of Patent: Sep. 19, 1995

[54] RADAR DEVICE FOR OBSTACLE WARNING

[75] Inventor: Helmut Klausing, Bad Aibling, Germany

[73] Assignee: Daimler-Benz Aerospace AG, Munich, Germany

[21] Appl. No.: 273,820

[22] Filed: Jul. 12, 1994

[30] Foreign Application Priority Data

Jul. 14, 1993 [DE] Germany .................. 43 23 511.5

[51] Int. Cl.$^6$ .................. G01S 13/90; G01S 13/93
[52] U.S. Cl. .................. 342/25; 342/29; 342/191
[58] Field of Search .............. 342/25, 28, 29, 191, 342/192, 193, 194, 197

[56] References Cited

U.S. PATENT DOCUMENTS

| 4,562,439 | 12/1985 | Peralta et al. | 342/81 |
|---|---|---|---|
| 4,626,860 | 12/1986 | Tricoles et al. | 342/442 |
| 4,638,315 | 1/1987 | Raven | 342/25 |
| 4,912,685 | 3/1990 | Gilmour | 367/88 |
| 5,017,922 | 5/1991 | Klausing et al. | 342/25 |
| 5,045,855 | 9/1991 | Moreira | 342/25 |
| 5,132,686 | 7/1992 | Witte | 342/25 |
| 5,166,688 | 11/1992 | Moreira | 342/25 |
| 5,182,562 | 1/1993 | Witte | 342/25 |
| 5,191,344 | 3/1993 | Moreira | 342/25 |
| 5,241,314 | 8/1993 | Keeler et al. | 342/54 |
| 5,379,041 | 1/1995 | Klausing | 342/25 |
| 5,381,152 | 1/1995 | Klausing | 342/25 |
| 5,392,047 | 2/1995 | Klausing | 342/25 |

Primary Examiner—John B. Sotomayor
Attorney, Agent, or Firm—McGlew & Tuttle

[57] ABSTRACT

The present invention pertains to a radar device with synthetic aperture based on rotating antennae (ROSAR principle), preferably for helicopters, which operates in the millimeter-wave range and is used mainly as an obstacle radar, wherein the full synthetic aperture length can be reached already within very short distances due to the arrangement of the antennae on a turnstile. Exemplary embodiments, calculations and representations are shown and explained.

10 Claims, 9 Drawing Sheets

RADAR DEVICE FOR OBSTACLE WARNING

FIELD OF THE INVENTION

The present invention pertains to a radar device for obstacle warning with synthetic aperture based on rotating antennae for obstacle warning for helicopters with a processor for a ROSAR device as well as with a transmitter and a receiver and with antennae for transmitting and receiving radar pulses, wherein the antennae are arranged at the end of a rotating arm, such as of a helicopter rotor or of a turnstile above the plane of the helicopter rotor.

BACKGROUND OF THE INVENTION

A radar device with a transmitter and a receiver, as well as with an antenna for transmitting and receiving radar pulses, in which the antenna is arranged at the end of a rotating arm, e.g., of a helicopter rotor or of a turnstile, above the rotor axis, has been known from German Patent No. DE-PS 39,22,086. Such a radar device with synthetic aperture based on rotating antennae is called a ROSAR device. The use of a turnstile instead of the rotor blades does not cause any fundamental changes in the ROSAR principle, and it merely has the disadvantage of a lower lateral resolution, but it also has the essential advantage that the full synthetic aperture length is already reached within short distances. In addition, the turnstile has a high mechanical stability. Such a device can be used near real time in on-line operation, and it can also be used for target reconnoitering and target tracking, besides cartography, obstacle warning or as a landing aid. Another field of application is in the precision approach of missiles. In the prior-art ROSAR device, the result for each distance interval is always obtained by correlation of the received signal with a reference function valid for the distance interval in question.

SUMMARY AND OBJECTS OF THE INVENTION

The primary object of the present invention is to expand and improve the prior-art ROSAR process such that it can be used nearly in real time in an on-line operation and can also be used for target reconnoitering, target tracking and the precision approach of missiles, besides cartography, obstacle warning or as a landing aid, and that the full synthetic aperture length is already reached within short distances.

According to the invention, a radar device is provided with synthetic aperture based on rotating antennae for obstacle warning for helicopters with a processor for a ROSAR device as well as with a transmitter and a receiver and with antennae for transmitting and receiving radar pulses, wherein the antennae are arranged at the end of a rotating arm, such as of a helicopter rotor or of a turnstile above the plane of the helicopter rotor. The device performs signal processing for distances which are outside the range that is relevant for the obstacle warning, e.g., beginning from 500 m according to a non-focussed method. A threshold value detector, which automatically switches over to focussed signal processing when a certain amplitude of the correlation peak is exceeded, is arranged for this purpose. The number of distance intervals is kept low by varying a size of these distance intervals, by the intervals becoming smaller in the close range. As a consequence of this the radial resolution is better than in the distant range. The radial transmitter/receiver units belonging to the respective antennae operate at different frequencies and preferably in the millimeter range in terms of signal evaluation. The principle of synthetic aperture (ROSAR with weakly focussing antennae) is combined with the principle of the real aperture (sharply focussing antennae).

A frequency modulated continuous wave (FM-CW) radar device may be used whose linear transmission frequency modulation has the band width necessary for generating the radial resolution. The antennae, which are arranged at the end of the rotating arm and which generate an arc-shaped synthetic aperture, are directed either directly in the radial direction or directly toward the ground. Two weakly focussing antennae for signal processing according to the principle of the synthetic aperture based on ROSAR are combined with two more sharply focussing antennae according to the principle of the real aperture on a common support.

The antennae may also be arranged such that they can be directed in the direction of flight of the helicopter for obstacle warning or toward the ground for mapping the ground. The transmitter/receiver units associated with the respective antennae operate at different frequencies for signal evaluation and or range to co-rotating on the rotating arm. The depression angles are variable from one antenna to the next to illuminate staggered circular rings on the ground. Data pre-processing may be performed by means of a processor circuit on the rotor arm in order to already reduce the data rate before the signal processing and image generation. An electrical or optical coupling means may be provided for data transmission from the rotor arm into the helicopter cabin.

The processor is preferably provided with a first channel for generating the reference functions and a second channel for receiving the signals, reflected from the ground. The first channel has a geometry component and a processor circuit, for dividing the illuminated area into individual distance intervals. A processor component is provided which calculates the reference functions for these distance intervals and sends the reference functions to a memory. The second channel accommodates a quadrature modulator for the echo signals, whose components are sent to an analog to digital converter and converter are sent from the A/D converter into a memory. The signals stored in the memories and synchronously transferred into a correlator, whose correlation signals are sent to a monitor for display and to an evaluation unit.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
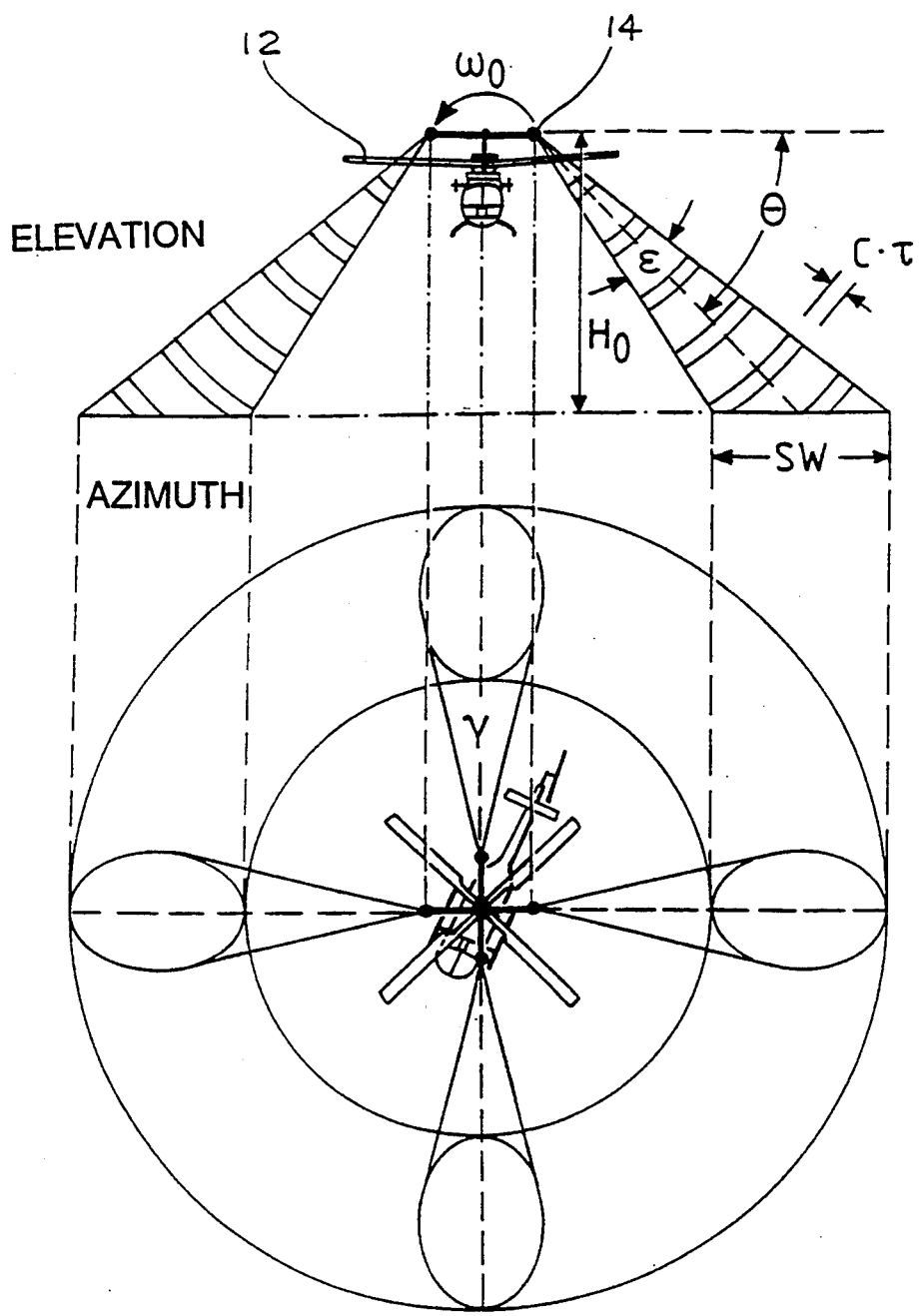
FIG. 1 is a schematic diagram of the ROSAR illumination geometry with the turnstile above the rotor in the rotor axis.

FIG. 1 schematically shows the ROSAR illumination geometry with the turnstile above the rotor axis (not true to scale) of the rotor blade 12.

In the oblique downward viewing direction, a circular ring is illuminated by the antennae 14 arranged in the tips of the arms of the turnstile, and the width of the illuminated strip depends on the aperture angle of the antenna in elevation, $\epsilon$, the depression angle $\Xi$, and the height $H_O$ of the support platform. The immediate surroundings of the helicopter are illuminated in the case of direct radial radiation, e.g., for obstacle warning. The Doppler spectrum needed for image generation is generated by rotating the antennae accommodated in the tips of the arms of the turnstile, without a translatory movement of the support platform being necessary. The rotation of the antenna ensures a panoramic view, i.e., ROSAR is able to cover the entire 360° angle range. The same antenna is used for the transmission process and reception process. The transmitted pulses necessary for scanning are radiated via the antenna during the rotary movement at a predetermined pulse repetition frequency, and the echo signals are received via the same antenna. The pulse repetition frequency fp is determined, just as in the case of the linear movement of the antenna, by the Doppler band width of the received signal. The radar device is a pulsed radar or, as an alternative to this, an FM-CW radar. The signal evaluation and the image generation is performed, after a certain data processing, in the co-rotating transmitter and receiver unit on board the helicopter by means of a specific ROSAR processor. Due to the movement of the antenna along a circular path, the angular range $\Delta\alpha = -\omega_O/fp$ corresponds to the time interval $Tp = 1/fp$ between two transmitted pulses in ROSAR, and to $\omega_O$ is the angular velocity of the antenna arm. The illuminated strip on the ground is a circular ring, and the signal processing is therefore performed as a function of the angle of rotation $\alpha = \omega_O T$. The position of the imaged target is completely determined by the indication of the radial distance and of the angle of rotation. This also requires the position of the antenna during the rotary movement to be fixed and each new revolution to be marked.

Planar rotary movement at constant angular velocity was assumed in the previous studies on the feasibility of ROSAR. However, the rotating arms perform, in practice, deterministic and stochastic movements deviating from an ideal circular path, which must be measured and fed as correction signals into the ROSAR processor. The illumination geometry in elevation and azimuth also changes due to the flight of the helicopter in curves and forward flight. This change also must be taken into account within the framework of signal processing and in the representation of the radar image in the helicopter. The received signal undergoes an additional Doppler modulation in the azimuth as a consequence of an additional velocity component of the support platform.

The resolution power of the helicopter radar is an indicator of the ability of two adjacent targets of equal echo area to be separated, and it is indicated as an angle in the azimuth and in elevation and as a distance in the radial direction.

The synthetic aperture process uses the path of the antenna during the illumination of a target to artificially increase the length of the antenna, rather than using the focusing of the antenna lobe for lateral resolution. The synthetic aperture is formed due to the fact that a punctiform target is illuminated within the lobe of a real antenna, which moves along the flight path, and all received echoes are stored in terms of amount and phase. This flight path covered during the illumination of the target is called synthetic aperture.

Because of the changing distance between the antenna and the target, the echo signal received exhibits a Doppler frequency shift compared with the transmitted signal. Each illuminated target is then characterized by its characteristic Doppler frequency pattern and can be distinguished, in principle, from adjacent targets. Signal theory teaches that the best possible resolution is reached when the receiver is adapted to the expected received signal. This requirement is satisfied by an optimal filter. If this optimal filter is embodied by a correlator, cross correlation between the received signal and a function to be expected from the measurement process takes place in the radar with synthetic aperture. This function is called the reference function. The reference function is derived from the illumination geometry for an individual target on the ground during scanning by the antenna within a predetermined distance interval, and the radial resolution is predetermined, as in the case of a conventional pulsed radar, by the pulse length respectively the band width of the transmitted signal.

During lateral resolution, the antenna moves along an arc in ROSAR, so that the indication of the lateral resolution cannot be taken over from the theory of linear SAR. The angle range relevant for the imaging now extends approximately over the semicircle of the plane of rotation when the passage of the blade in the direction of the illuminated target defines the zero point of the angle of rotation. By limiting the maximum length of the synthetic aperture to the semicircle, it is easy to understand that the resolution in ROSAR continues to be dependent from the distance, in contrast to the linear SAR.

The lateral resolution $\bar{\Delta}xx$ that can be reached with the ROSAR process in the distance from the target $R_{GO}$ can be calculated with the estimated angular resolution $\tilde{\alpha}_{AZ}$:

$$\tilde{\alpha}_{AZ} = \frac{\lambda}{5 \cdot L \cdot \sin(\gamma/2)}$$

to obtain:

$$\tilde{\Delta x} = \tilde{\alpha}_{AZ} \cdot R_{GO} = \frac{\lambda}{5 \cdot L \cdot \sin(\gamma/2)} \cdot R_{GO}.$$

Here, $\lambda$ is the wavelength of the transmitted signal, L is the length of the antenna arm, and $\gamma$ is the opening angle of the antenna in the azimuth.

Figure 2:
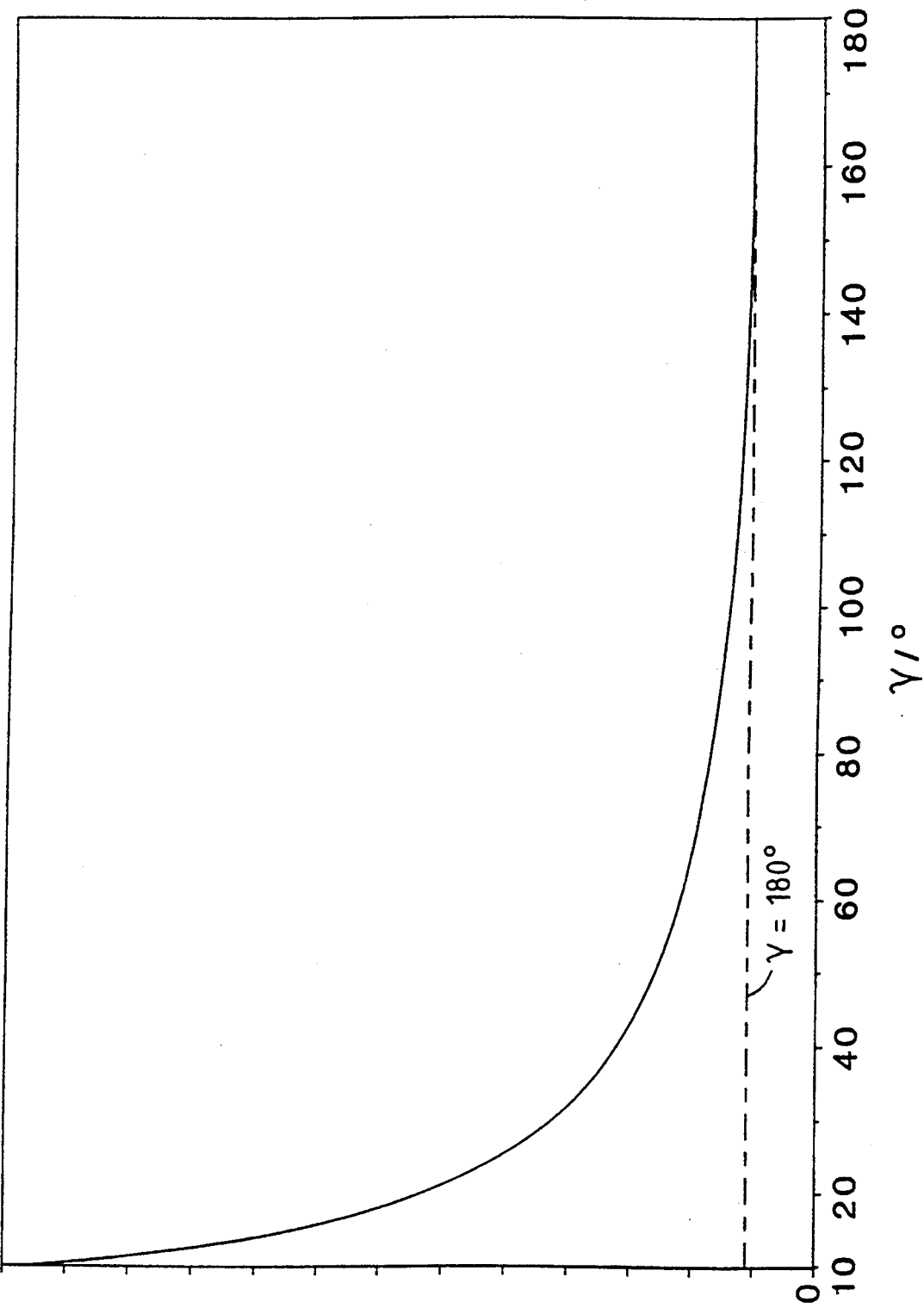
FIG. 2 is a diagram illustrating the changes in angular resolution as a function of the opening angle of the antenna in azimuth.

FIG. 2 shows the changes in the angular resolution $\tilde{\alpha}_{AZ}$ as a function of the opening angle of the antenna in the azimuth $\gamma$.

It is assumed in the estimation that the full length of the possible synthetic aperture has already been reached, i.e., $$\tilde{S} = \gamma \cdot L.$$

If not, then $$S = \gamma \cdot L \cdot \left(1 - \frac{L}{R_{GO}}\right)$$

applies.

The range of angle of rotation as belonging to the opening S during the illumination of a target 0 is calculated to be:

$$\alpha_S = \frac{S}{L}.$$

The synthetic aperture S is the path of the phase center of the antenna A with the opening angle $\gamma$, which is covered during the illumination of a target 0. The path of the antenna is a circular path in ROSAR, so that the synthetic aperture S is defined as an arc sector.

Figure 3:
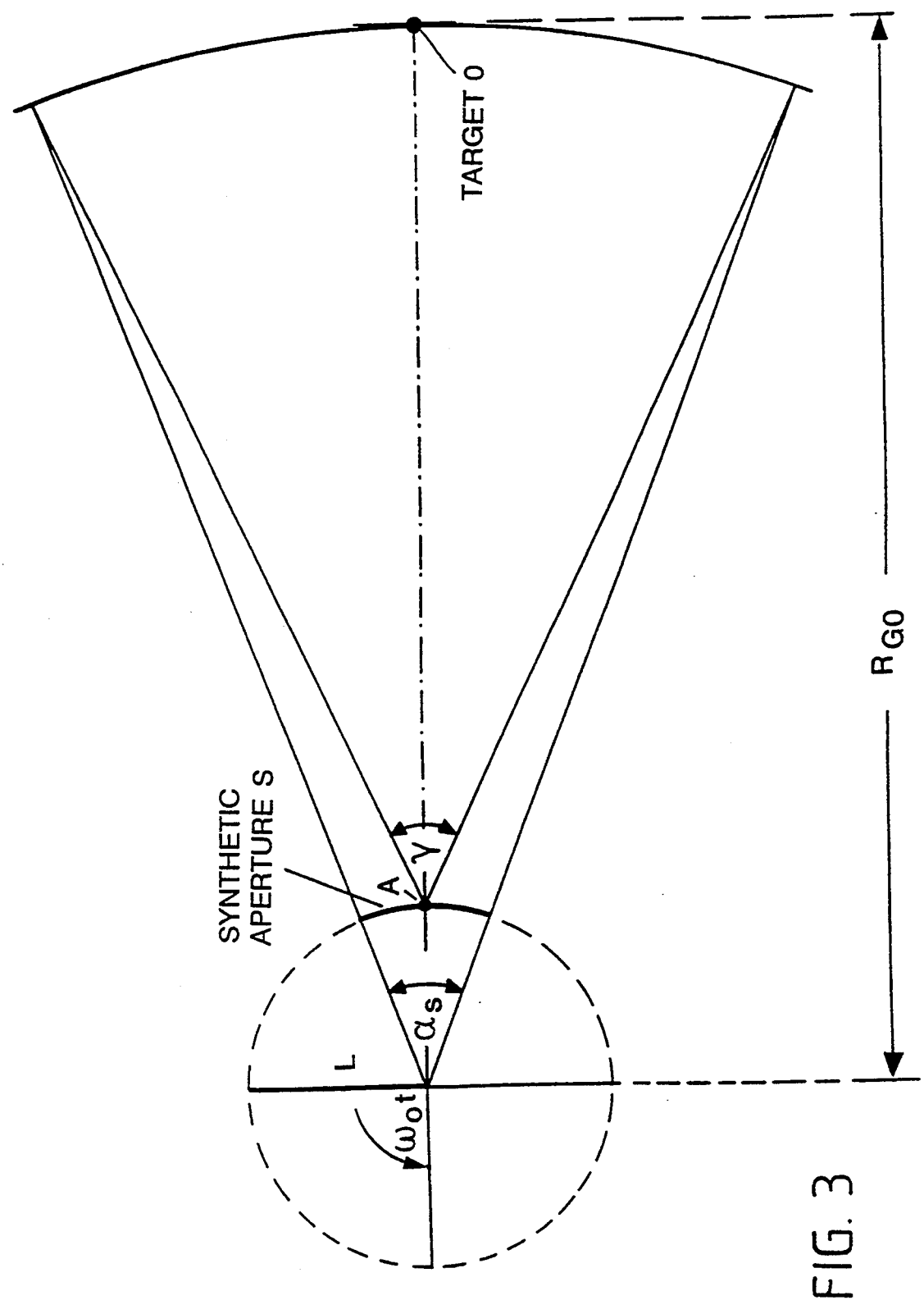
FIG. 3 is a representation of the geometric arrangement to define the synthetic aperture S.

FIG. 3 shows the geometric arrangement for the definition of the synthetic aperture S. The length of the synthetic aperture S depends on the opening angle of the antenna A in the azimuth, $\gamma$, the ground distance $R_{GO}$ from the target 0, and the length of the antenna arm L. It is assumed that the maximum aperture is limited to the semicircle of the plane of rotation, because only the range of angular rotation which actually causes a change in the aspect angle to the target and also increases the Doppler bandwidth at the same time contributes to the lateral resolution. If the full length of the synthetic aperture is not yet reached at the given distance from the target, the angular or lateral resolution that can be reached will be correspondingly lower. The full synthetic aperture length S must be reached rapidly in the case of an obstacle warning radar because of the short range and the high lateral resolution required. Since the synthetic aperture length S depends directly on the length of the antenna arm L (factor $L/R_{GO}$), the use of the turnstile with e.g., L=1.5 m is definitely advantageous.

The maximum possible synthetic aperture length $S_{max}$ equals, with L=1.5 m, as a function of the opening angle of the antenna in the azimuth $\gamma$:

$\gamma = 45°$: $S_{max}(R_{GO} \rightarrow \infty) = 1.18$ m $\gamma = 70°$: $S_{max}(R_{GO} \rightarrow \infty) = 1.83$ m.

With L=1.5 m, the opening length S equals, as a function of the opening angle of the antenna in the azimuth $\gamma$:

$\gamma = 45°$: $S(R_{GO}=5\ m) = 0.82$ m $\gamma = 70°$: $S(R_{GO}=5\ m) = 1.28$ m and consequently 70% of the maximum value, already at the ends of the helicopter rotor blade ($R_{GO}=5$ m).

Now, with L=1.5 m and e.g. $\gamma = 6.25 \cdot 10^{-3}$ m (48 GHz), $\gamma = 45°$: $\tilde{\alpha}_{AZ} = 0.12°$ $\gamma = 70°$: $\tilde{\alpha}_{AZ} = 0.08°$ apply to the angular resolution $\tilde{\alpha}_{AZ}$ as a function of the opening angle of the antenna in the azimuth $\gamma$.

Figure 4:
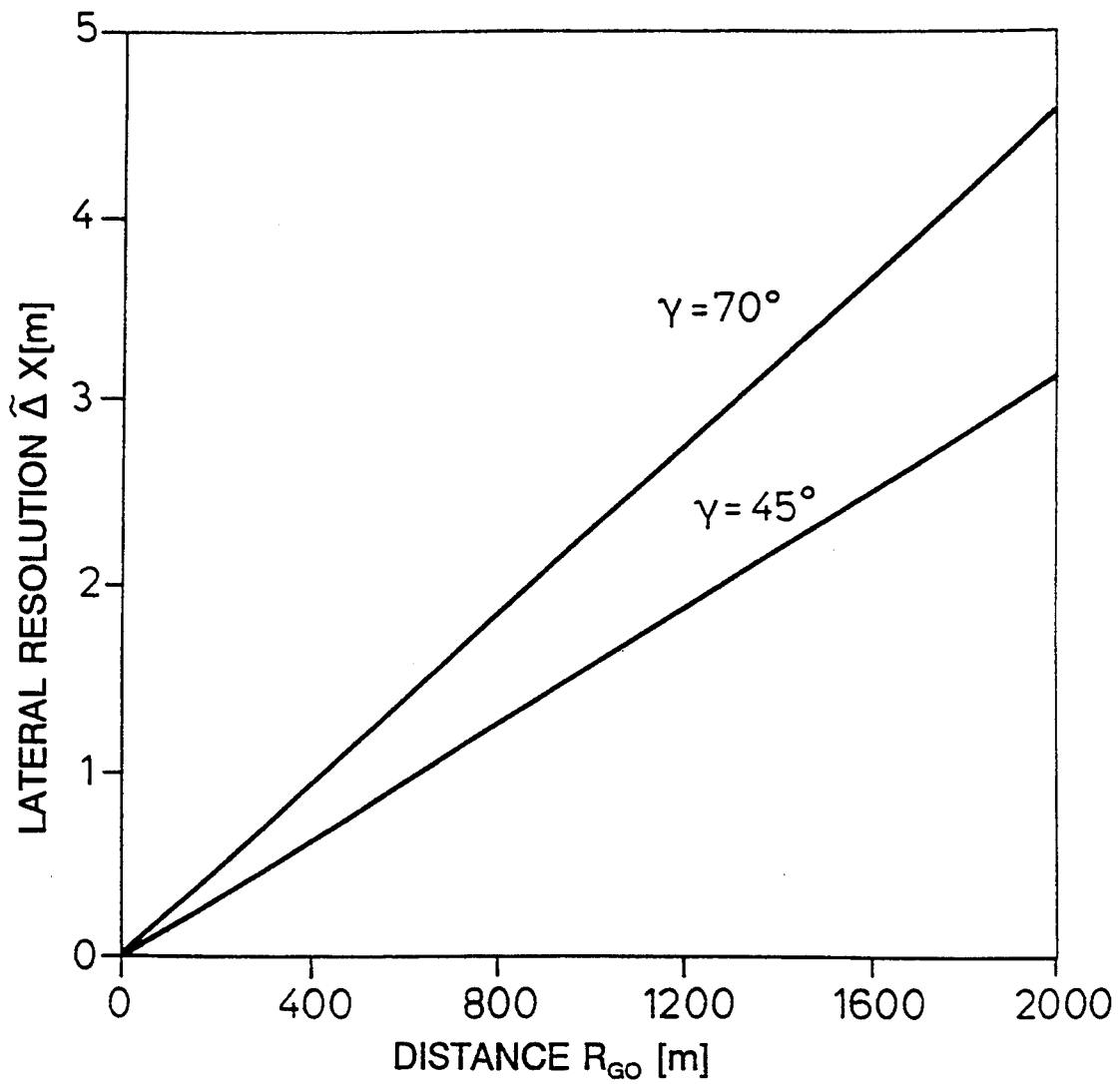
FIG. 4 is a diagram illustrating the changes in lateral resolution as a function of the distance to the target for different opening angles of the antenna in the azimuth.

FIG. 4 shows an example of the changes in the lateral resolution $\Delta X$ with L=1.5 m and $\lambda = 6.25 \cdot 10^{-3}$ m as a function of the distance from the target $R_{GO}$ for $\gamma = 45°$ and $\gamma 32\ 20°$: These resolution values are probably sufficient for the detection of wires, because wires are to be only detected, but not necessarily resolved. If the adjacent antennae within the antenna fans are interfered with by minor lobes, an even lower value may be selected for $\gamma$, because even the lower lateral resolution associated with it is still sufficient.

The angular resolution in elevation is predetermined by the ability of the real antenna lobe with the opening angle $\epsilon$ to be focused, i.e., there is no improvement in resolution according to the principle of the synthetic aperture. A realistic value for focusing the real antenna lobe is in the range of 2° to 5°.

The radial resolution $\Delta R_{Smin}$ is calculated, in the case of a pulsed radar, with the compressed transmitted pulse length $\tau$ the speed of light c, and the bandwidth $B = 1/\tau$ as follows:

$$\Delta R_{Smin} = \frac{c \cdot \tau}{2} = \frac{c}{2 \cdot B}.$$

To achieve a satisfactory power balance, the pulse compression process should be used. However, a dead range, which is proportional to the transmitted pulse width, is formed due to the artificial increase in the transmitted pulse width during pulse compression, as a consequence of which the FM-CW radar is a promising alternative to the pulsed radar. The band width B, which is necessary for the radial resolution, is generated in this radar process by linear modulation of the transmission frequency.

Figure 5:
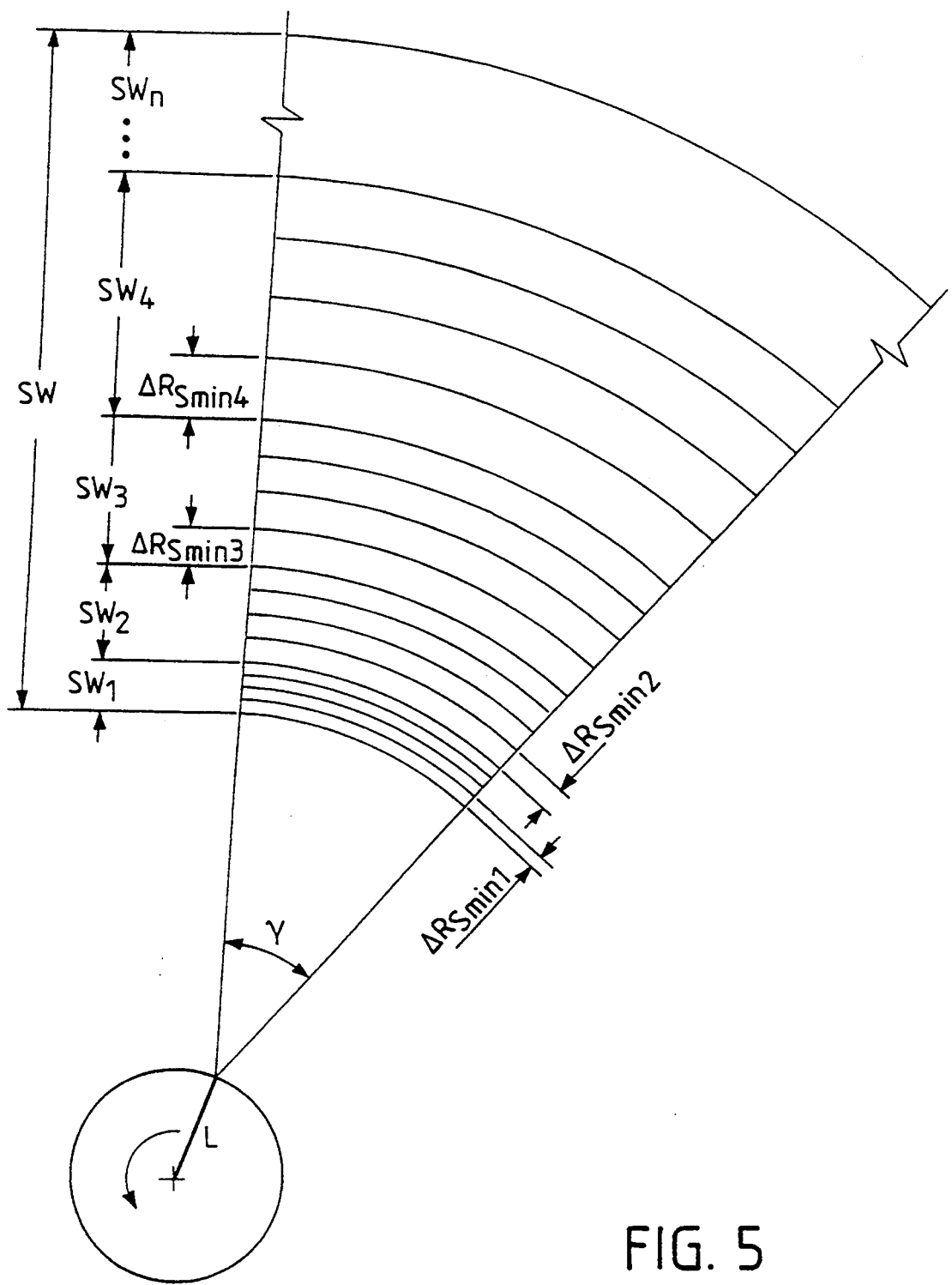
FIG. 5 is a schematic diagram of the radial resolutions which define the length of the distance intervals, wherein the radial resolution is better in the close range than in the distant range.

To guarantee signal processing at a reasonable expense, it is suggested that the number of distance intervals, i.e., resolution cells, be kept as small as possible. This can be achieved by varying the size of the distance intervals, i.e., the distance intervals will be smaller in the close range, i.e., the radial resolution will be better than in the distant range. FIG. 5 shows the corresponding picture with the respective radial resolutions $\Delta R_{SMini}$ (here, i=1 to 4), which define the length of the distance intervals.

In the case of the detection of wires, wires reached mainly at right angles or in a deposition area of a few degrees generate a marked backscattered signal, because wire obstacles having an extension greater than the wavelength act as a reflecting wall. A great advantage of the ROSAR process is the fact that illumination at right angles takes place at a high probability during the illumination of the wire due to the relatively large opening angle of the antenna in the azimuth $\gamma$. Furthermore, in the case of an angle of rotation range of a few degrees during the illumination of a line section, the illuminated length of this section is already a few meters. This line section will no longer appear as a single pin-point target in the received signal, but it represents a chain of adjacent pin-point targets in the radar image, whose echo signals are statistically superimposed. These adjacent pinpoint targets can be connected in the processed radar image according to the correlation with the reference functions by means of a threshold value detector. If the resolution cell is sufficiently small, a "wire line" will automatically extend through the adjacent cells in the radar image. This wire line can be displayed on the radar image by using special mathematical algorithms, i.e., the points located on a straight line are connected to form a line.

It is assumed in the overall concept of an obstacle warning radar based on ROSAR that the ROSAR must be able to be used for both obstacle warning and cartography, i.e., for imaging the ground. To ensure this, the antennae are arranged such that they either point directly in the radial direction or are also directed toward the ground, thus making it possible to image the ground.

An arc-shaped synthetic aperture is generated by the antennae arranged at the end of the rotating arm, and the illuminated area is defined mainly by the antenna parameters in the azimuth and elevation. The boundary conditions of the illumination geometry are determined by the flight and landing design of the helicopter.

Figure 6A:
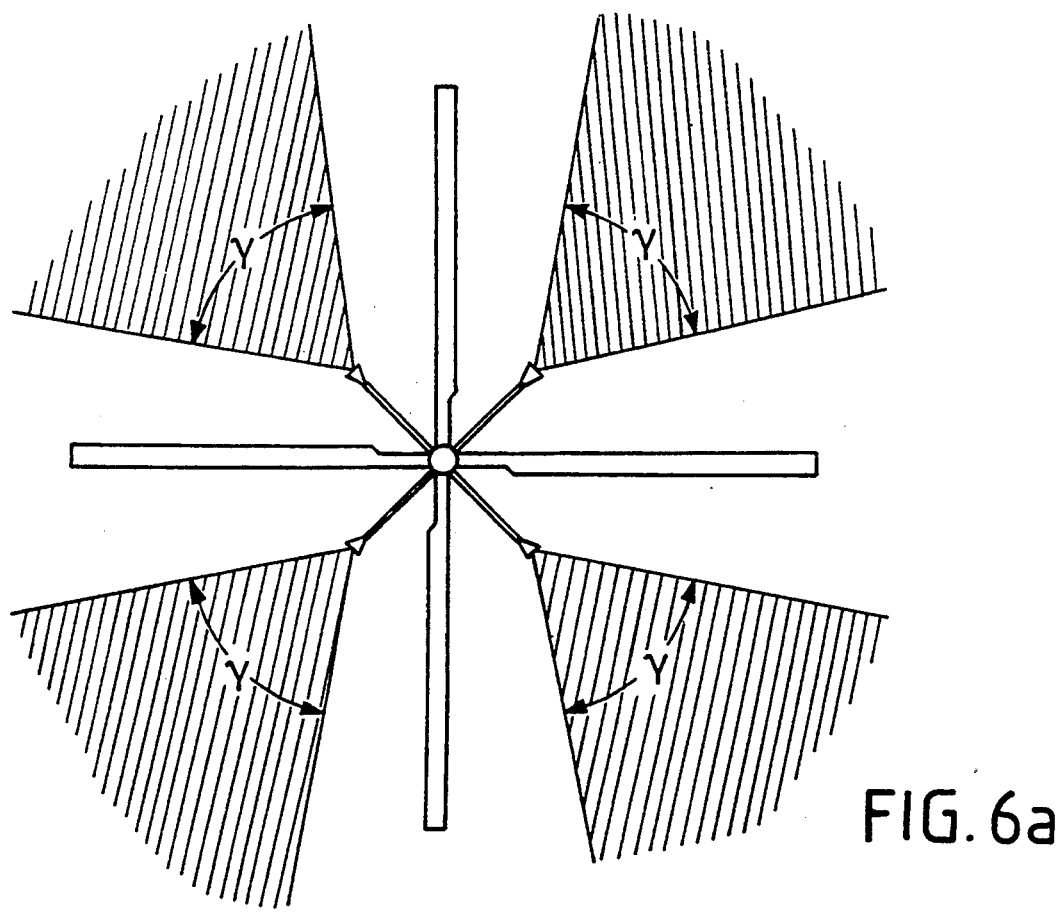
FIG. 6a is a schematic diagram of the illuminated area in the azimuth, with all opening angles being equal.
Figure 6B:
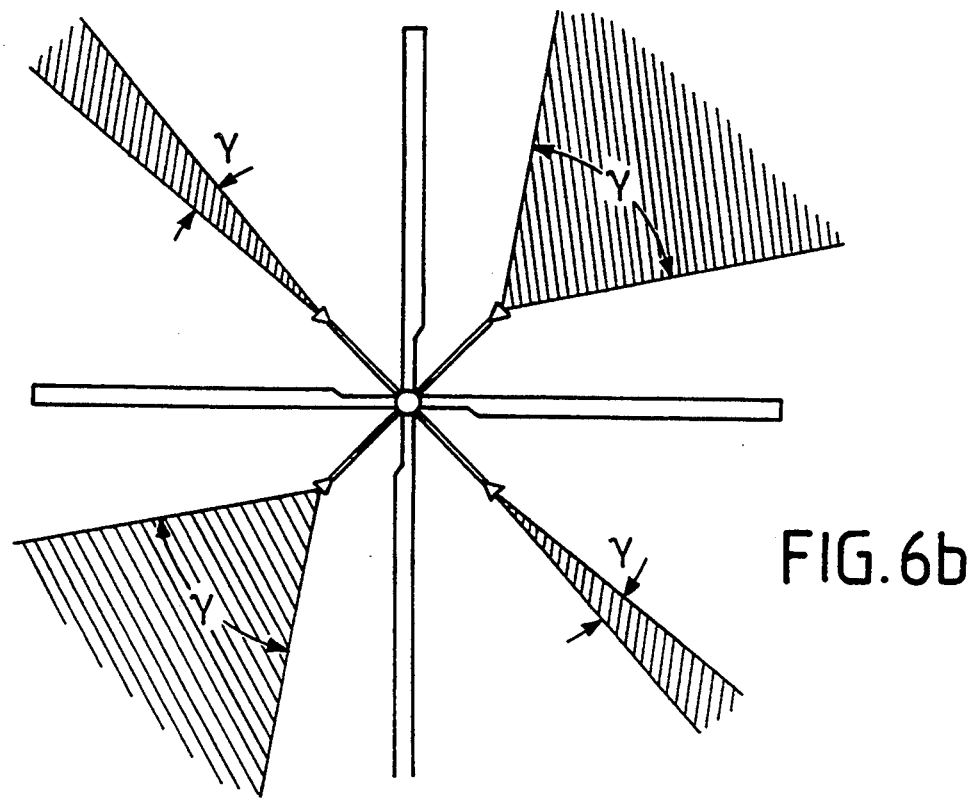
FIG. 6b is a schematic diagram of the illuminated area in the azimuth, with two weakly focusing antennae operating according to the principle of the synthetic aperture based on the ROSAR principle, and two sharply focusing antennae operating according to the principle of the real aperture.

FIGS. 6a and 6b show different exemplary embodiments in terms of the illuminated area in the azimuth with the antenna opening angles in the azimuth $\gamma$. All opening angles are equal in FIG. 6a, i.e., the operating parameters for signal processing according to the ROSAR principle are equal as well. FIG. 6b shows an example of a design with two weakly focusing antennae for signal processing according to the principle of the synthetic aperture based on ROSAR, and with two more sharply focusing antennae according to the principle of the real opening. According to the principle of the real opening, the lateral resolution is reached solely by the focusing ability of the antenna. The disadvantage of this principle with real opening is the limited lateral resolution. The advantage of the real opening is the fact that the signal processing can be performed in a considerably simplified manner. The real opening can offer sufficient resolution and can be used for obstacle warning precisely in the close range.

Figure 7A:
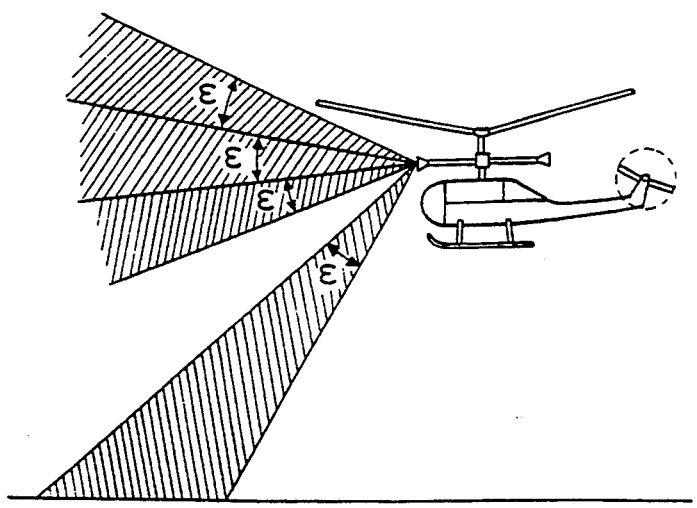
FIGS. 7a, show exemplary embodiments for the illumination geometry 7b and 7c in elevation with the opening angles of the antenna in elevation E in a schematic representation.
Figure 7B:
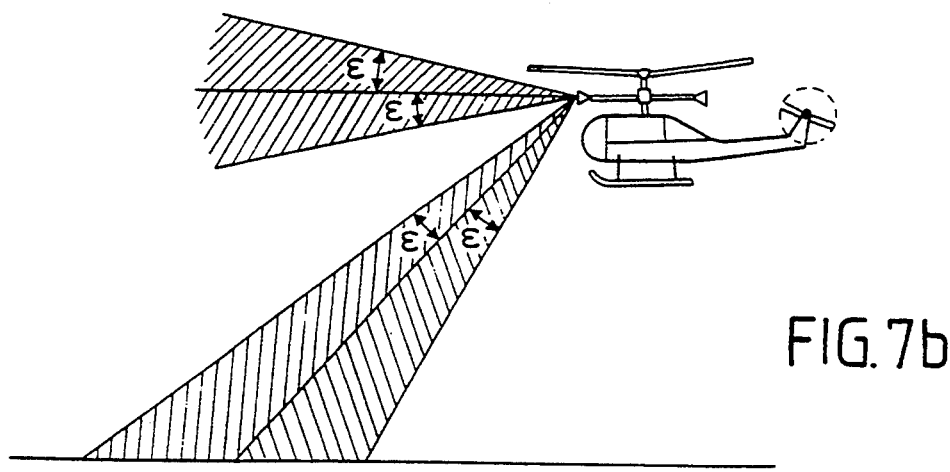
FIG. 7d is an exemplary embodiment of the circular ring illumination for ground imaging.
Figure 7C:
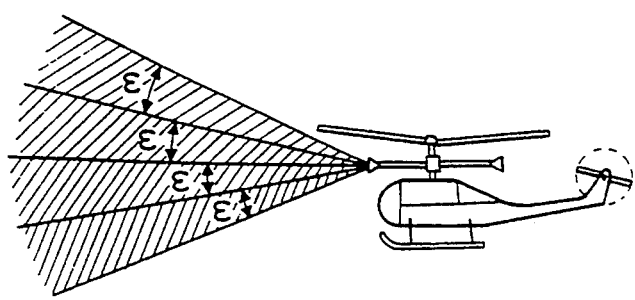

FIG. 7a through FIG. 7c show exemplary embodiments for the illumination geometry in elevation with the antenna opening angles in elevation $\epsilon$. A plurality of antennae with different opening angles $\epsilon$ and inclination angles from the plane (depression angles) may be arranged at the ends of each rotating arm, or individual antennae are distributed among the rotating arms. Furthermore, the antennae may be directed such that they face in the direction of flight of the helicopter for obstacle warning or are inclined toward the ground and thus cartographically image the ground. The transmitter/receiver units belonging to the specific antennae and consequently the radar design can operate, in terms of signal evaluation, at different frequencies in order to avoid disturbances as a consequence of interferences.

Figure 7D:
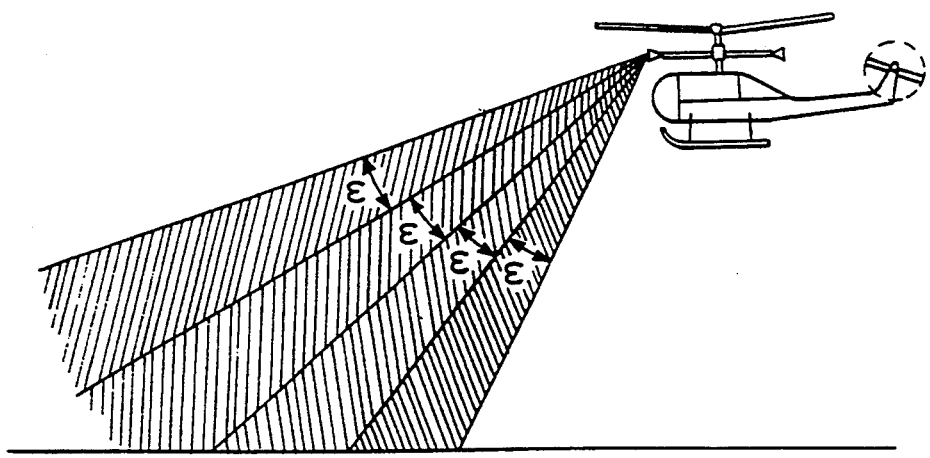

In addition, there is another possibility for ground imaging, namely, to illuminate circular rings on the ground in a staggered pattern by varying the depression angle from one antenna to the next and consequently from one rotating arm to the next, as a result of which the signal processing per antenna is considerably accelerated (FIG. 7d).

Figure 8:
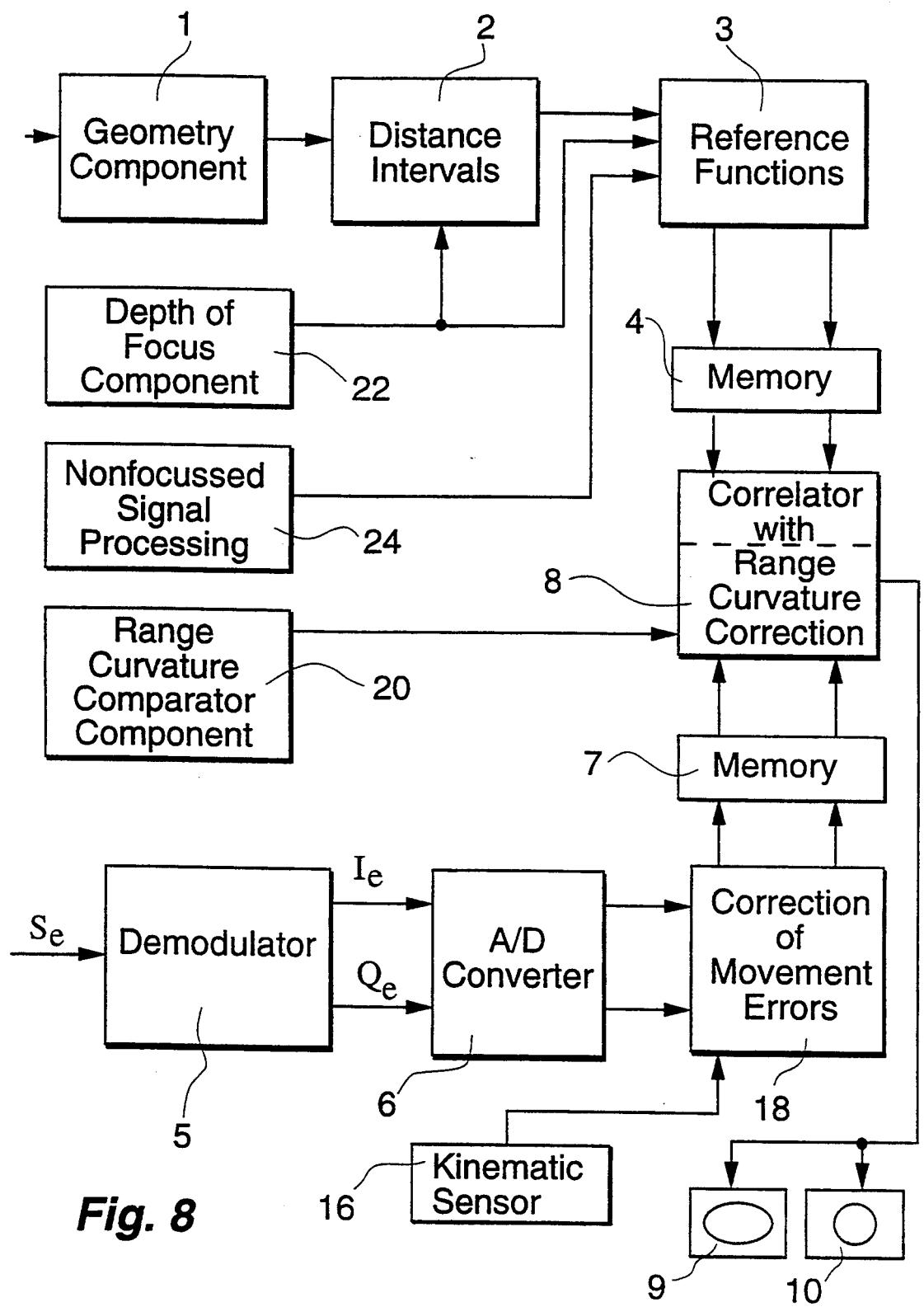
FIG. 8 is a block diagram of a processor for a ROSAR device.

FIG. 8 shows a circuit diagram of a processor for a ROSAR device, in which the components needed to generate the reference functions are shown in the top half of the block diagram, corresponding to a channel, and the components used to receive the signals reflected from the ground are represented in the bottom half, corresponding to a second channel.

A geometry component 1 is provided in the first channel, and the said geometry component 1 calculates, on the basis of the altitude $H_O$ of the antenna above ground and other parameters, especially the depression angle, the inclination angle and the length of the rotor arm, various magnitudes and functions, which are sent to a processor circuit 2 for dividing the illuminated area into individual distance intervals. The said processor circuit 2 is connected to a processor component 3, in which the reference functions for the individual distance intervals are calculated on the basis of the output signals of the said processor circuit 2. The reference functions needed for the correlation are transferred into a memory 4.

In the second channel, the echo signals $S_e$ are sent to a quadrature demodulator 5 and are divided into the in-phase component $I_e$ and the quadrature component $Q_e$. The two components are sent to analog-digital converters 6, at the output of which discrete scan values are available. These complex echo signals are then transferred into the memory 7 for the correlation. The received signals $S_E$ for the respective distance intervals are integrated in the said memory 7 from the echo signals belonging to those intervals. The signals stored in the said respective memories 4 and 7 are sent synchronously to a correlator 8 and are correlated. The result of the correlation is shown on a display, e.g., a monitor 9 and/or forwarded to an evaluation unit 10.

In addition to the processor components described, components for
- unfocussed signal processing 24,
- depth of focus calculation 22,
- range curvature correction 20, and
- the correction of movement errors 18 are provided.

The kinematic sensor 16 for correcting movement errors consists essentially of different acceleration sensors. Changes in terms of the velocity and the path can be measured by means of these acceleration sensors by integration or double integration. The movement errors to be measured, i.e., the deviations from the ideal circular path, result from, e.g., rolling and pitching movements of the helicopter and, as a consequence of this, from movements of the turnstile with the antennae integrated in the tips of the arms. Furthermore, movement errors develop due to the speed of flight of the helicopter, which also must be corrected.

The received signals can be corrected by measuring the phase errors occurring in the received signal as a consequence of the deviations from the ideal circular path as if they originated from the ideal circular path. The optimal correlation result, which corresponds to the ROSAR theory, and consequently the lateral resolution, are obtained only for the corrected case, i.e., for the ideal circular path, by correlating the received signal with the reference function, which is always calculated for the ideal case.

While specific embodiments of the invention have been shown and described in detail to illustrate the application of the principles of the invention, it will be understood that the invention may be embodied otherwise without departing from such principles.

What is claimed is:

1. Radar device with synthetic aperture based on rotating antennae for obstacle warning for helicopters, with a processor for a ROSAR device as well as with a transmitter and a receiver, and with antennae for transmitting and receiving radar pulses, wherein the antennae are arranged at the end of a rotating arm, comprising:

means associated with said processor for performing signal processing according to an unfocused method for distances which are outside a range that is relevant for the obstacle warning;

threshold value detector means for automatically switching over to focused signal processing when a certain amplitude of the correlation peak is exceeded;

means for keeping a number of distance intervals low by varying a size of these distance intervals by these intervals becoming smaller in the close range, as a consequence of which radial resolution is better than in the distant range;

means for operating said transmitter/receiver units, belonging to the respective antennae, at different frequencies and preferably in the millimeter range in terms of signal evaluation; and means connected to said processor for employing the principle of synthetic aperture (ROSAR with weakly focusing antennae) combined with the principle of the real aperture (sharply focusing antennae).

2. Radar device in accordance with claim 1, wherein said radar device is a FM-continuous wave radar whose linear transmission frequency modulation has the band width necessary for generating the radial resolution.

3. Radar device in accordance with claim 1 wherein said antennae generate an arc-shaped synthetic aperture, directed either directly in the radial direction or directly toward the ground.

4. Radar device in accordance with claim 1, wherein two weakly focusing antennae for signal processing according to the principle of the synthetic aperture based on ROSAR are combined with two more sharply focusing antennae according to the principle of the real aperture on a common support.

5. Radar device in accordance with claim 1 wherein said antennae are arranged such that they can be directed in a direction of flight for obstacle warning or toward the ground for mapping the ground.

6. Radar device in accordance claim 1 wherein said transmitter/receiver units associated with the respective antennae operate at different frequencies for signal evaluation and are arranged co-rotating on said rotating arm.

7. Radar device in accordance with claim 1 further comprising: means for varying depression angles from one antenna to the next to illuminate staggered circular rings on the ground.

8. Radar device in accordance with claim 1 further comprising: rotor arm processor circuit means for preprocessing, said rotor arm processor circuit means being positioned on the rotor arm in order to reduce the data rate before signal processing image generation.

9. Radar device in accordance with claim 1 further comprising: an electrical or optical coupling means provided for data transmission from the rotor arm into a helicopter cabin.

10. Radar device in accordance with claim 1 wherein said the processor has a first channel for generating reference functions and a second channel for receiving signals reflected from the ground, wherein the first channel has a geometry component and a processor circuit for dividing an illuminated area into individual distance intervals, as well as a processor component which calculates the reference functions for these distance intervals and sends them to a memory, and the second channel accommodates a quadrature modulator for echo signals, whose components are sent to an A/D converter and are sent from there into a memory, and the signals stored in the memories are synchronously transferred into a correlator, whose correlation signals are sent to a monitor for display and to an evaluation unit.

* * * * *